Sept. 25, 1956 L. E. JOHNSON, JR 2,764,304
FARM WAGON UNLOADING MECHANISM

Filed Nov. 29, 1952 3 Sheets-Sheet 1

Inventor:
Lawrence E. Johnson Jr.

Sept. 25, 1956  L. E. JOHNSON, JR  2,764,304
FARM WAGON UNLOADING MECHANISM
Filed Nov. 29, 1952  3 Sheets-Sheet 2
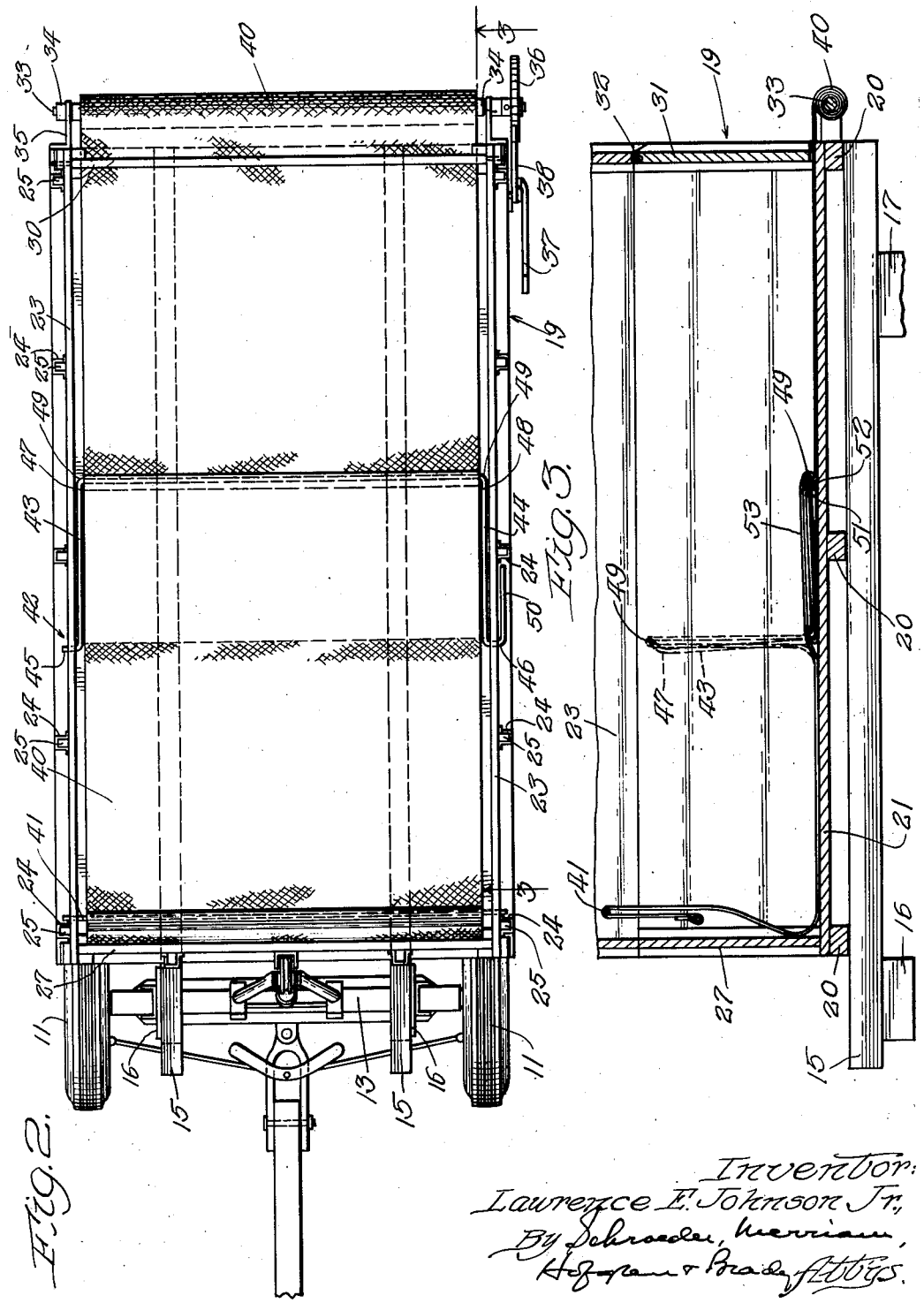
Inventor:
Lawrence E. Johnson Jr.
By Schroeder, Merriam,
Hofgren & Brady Attys.

Sept. 25, 1956 L. E. JOHNSON, JR 2,764,304
FARM WAGON UNLOADING MECHANISM
Filed Nov. 29, 1952 3 Sheets-Sheet 3
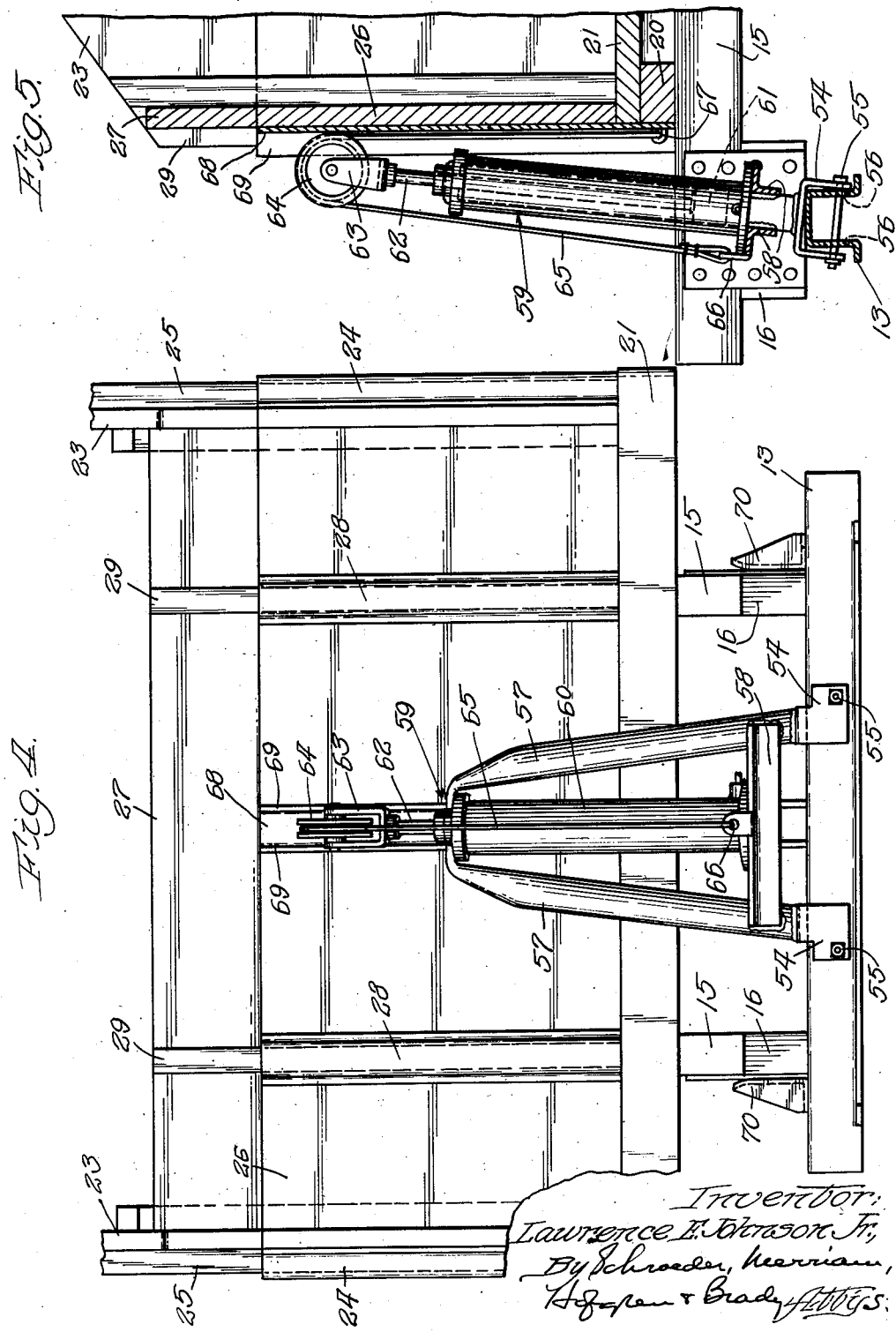

2,764,304

FARM WAGON UNLOADING MECHANISM

Lawrence E. Johnson, Jr., Hinsdale, Ill.

Application November 29, 1952, Serial No. 323,226

10 Claims. (Cl. 214—501)

This invention relates to unloading mechanism for farm wagons which are used for hauling silage or other bulk materials.

One of the more recent developments in farm harvesting equipment is the forage harvester for making grass or corn silage. The forage harvester harvests and chops a field crop which it delivers to a wagon in which the silage is transported to a blower by means of which it is blown into the top of a silo. The blowers are ordinarily fed by a screw feed, and it is extremely important to feed silage from the wagon to the screw feed and the blower at a fairly even rate so that the feed and blower will not become overloaded and clog. Fresh silage is so moist that it packs heavily in a wagon box, and tends to feed off the tail gate of the wagon in large slugs which are more than the screw feed and blower can absorb and move at one time. Thus, the most diffifficult problem in designing wagons for hauling silage from a forage harvester is to provide means which break up a load of silage so that it flows into the screw feed for the blower at a fairly even rate.

There have been a number of unloading devices for farm wagons which are intended to lighten the labor of emptying a load of silage from the wagon. Insofar as applicant is aware none of them is wholly satisfactory because they do not properly break up the load. Much of the equipment is too expensive and too complicated for farm use, and is poor because it does not satisfactorily break up the load so that one or two men must work on top of the silage in the wagon box during unloading using forks to break down the top of the load and attempt to even the flow to the screw feed.

One type of unit is a flexible suction tube arrangement with a special blower which feeds into the elevating blower. Such units are relatively expensive, have no other use on the farm, and are very slow—about as slow as hand unloading. The standard blower by which silage is elevated to a silo can take the silage without clogging seven or eight times as fast as the vacuum unloading units can feed it using a 40 H. P. motor.

Some attempts have been made to use augers, but the wet silage packs together in such a way as to bridge over the auger so that the load must be continually broken down and fed into the auger by hand.

Some units have been produced which use a false end gate which may be pulled from front to rear of the wagon by cables wound on a drum to push the loaded silage off the rear of the wagon. Such false end gates tend to compress the load initially, and thus aggravate the problem of feeding off compact slugs. The last half of a load so compressed is practically in a baled condition, and thus is almost impossible to feed into the blower evenly without a tremendous amount of hand labor. Furthermore, any cable which is small enough to be practical for winding on a small drum at the rear of a wagon bed is so light that it is dangerously overloaded in such an operation. Furthermore, the compressing of the load tends to expand it sideways and springs the sides of the wagon box; while the weight of the end gate grooves the wagon bed rather rapidly, thus increasing frictional resistance and increasing cable overloading.

Some wagon boxes are provided with a continuous flexible steel mesh conveyor apron. These are relatively expensive, and the conveyor mechanism is too complicated to permit it to be removed from the wagon box, so that the wagon is substantially useless for any other purpose. Silage tends to work in between the mesh and the sprockets, throwing differential loads on the mechanism and causing frequent breakdown.

Unloading silage by elevating the front of the box has been attempted, but is not practical for this operation. A high lift such as is used on a standard dump truck will dump the load into the screw conveyor in entirely unmanageable quantities which will quickly clog the blower and the screw feed. If the box is lifted only a short distance the mass of silage must still be broken up and hand forked into the screw feed. This is very heavy and dangerous work.

The most satisfactory method of unloading is that in which a canvas apron is wound upon a drum at the rear of the wagon bed so as to draw the load off. The canvas stretches as it is pulled with a load of silage on it, thus having some tendency to break up the load as it is fed. After a certain amount of use the canvas polishes the wagon bed so as to reduce the frictional resistance. When the canvas is wound on the drum at the rear of the wagon it is out of the way so that the wagon may be used for other farm tasks. The initial cost is about as low as that for the false end gate units, and the results are far superior. No. 6 or No. 8 reverse construction duck has adequate tensile strength for the job—No. 8 duck has a tensile of about 252 pounds per inch of width, or about 7½ tons for a 60" wide apron. The apron may be paraffined and mildew treated to resist abrasion and rotting.

Even a canvas apron as above described is not entirely satisfactory, as hand forking is still required to break down the load as it moves off the tail gate of the wagon. It has been common practice for a number of years to make a fold in the canvas about midway of the length of the wagon bed, so that the rear part of the load is moved first, and as the fold is pulled out of the canvas apron the portion of the load adjacent the front of the wagon box may be forked down into the space, thus tending to give more even flow than is possible with an apron which is not folded. This practice is shown in Walz Patent 2,477,707. However, the folding of a canvas apron which is five feet or more in width and occupies substantially the full width of a wagon bed is a difficult problem. It is substantially impossible for one man to do alone, and it is difficult to get the fold straight—a very important factor in avoiding differential strains with several tons of sliage on the canvas. If the fold is made while the wagon is being moved from the silo back to the forage harvester it tends to become disarranged by the jouncing wagon and may be blown completely out if there is a strong wind. The Walz patent suggests the use of clamps at the margins of the canvas to hold it in its folded position, but these must be placed by hand and must be removed by hand before the canvas winds onto the drum at the rear of the wagon so as to avoid severe damage to the canvas. While the advantage of folding the canvas has been known for some time, the practical difficulty of making and retaining a fold in the canvas has prevented most farmers from using the folded canvas system. Even with a folded canvas some hand forking is required to help break down the load as it is moved out of the wagon. The angle of repose of wet silage is such that it can form a vertical wall, or even overhang, so that hand forking is required to break down the front of the load as the fold comes out of the canvas.

I have discovered that a folded canvas used in combination with a low level lift for the front of the wagon bed permits a load of silage to be discharged from a wagon at a controlled rate with very little hand forking of the silage. For this purpose I provide a wagon structure in which the front of the wagon box is positioned rearwardly of the front bolster of the wheeled frame on which the front of the sills for the box are supported so that a very inexpensive piston type hoist may be mounted on the front bolster to elevate the front of the wagon box. The protruding sills provide a step from which one may easily reach over the front of the wagon box. In the wagon box I provide a simple folding mechanism which may be manipulated by a handle outside the wagon box to form a fold in a canvas apron lying in the wagon bed, and the cross bar which forms the fold lies in the fold so that neither jouncing of the wagon nor high winds can disarrange the fold. Since the fold is formed by a transverse bar which lies beneath the canvas all that is necessary to assure a straight fold is to be certain that the canvas is lying straight in the wagon bed when the fold is made. The entire unit is only slightly more expensive than a simple canvas such as has been previously described, but delivers a load of silage to the screw feed for a blower in manageable quantities with less hand forking than is necessary with any unit heretofore available.

The principal object of the invention, therefore, is to provide a farm wagon which utilizes a combination of a lift and a folded canvas apron to unload silage from the wagon at a substantially uniform rate with very little hand labor.

A further object is to provide folding means which may be operated from outside the wagon box to make a fold in a canvas apron lying in the wagon bed and retain the fold until it is drawn out under power.

Yet another object is to provide a wagon structure in which the fronts of the sills rest on the front bolster, while the front of the wagon box is to the rear of the bolster so that a hoist may be mounted on the bolster to lift the front of the box; and the protruding sills provide a step from which one may reach into the box to work with the free end of the canvas.

The invention is illustrated in a preferred embodiment in the accompanying drawings in which:

Fig. 2 is a plan view thereof;

Fig. 3 is a fragmentary section taken as indicated along the line 3—3 of Fig. 2;

Fig. 4 is a fragmentary front elevation; and

Fig. 5 is a fragmentary section showing the hoist means.

Figure 1:
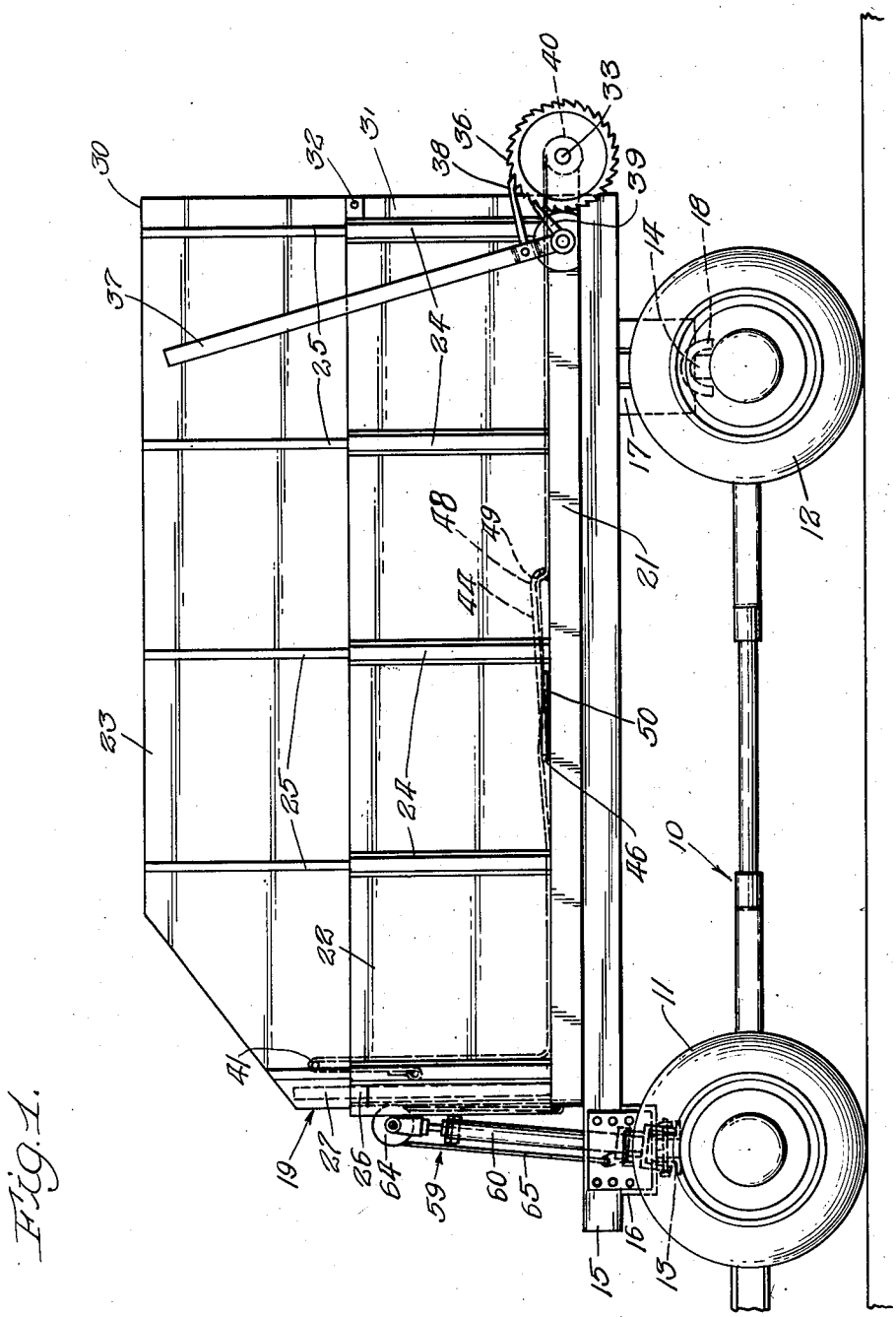
Fig. 1 is a side elevation of a farm wagon embodying the invention.

While this invention is susceptible of various modifications and alternative constructions, it is shown in the drawings and will hereinafter be described in a preferred embodiment. It is not intended, however, that the invention is to be limited thereby to the specific construction disclosed, but it is intended to cover all modifications and alternative constructions falling within the spirit and scope of the invention as defined in the appended claims.

Referring to the drawings in greater detail, a frame, indicated generally at 10, having front and rear wheels 11 and 12, is provided with conventional front and rear bolsters 13 and 14, respectively. A pair of spaced longitudinal sills 15 are provided at their forward ends with support blocks 16 which rest upon the front bolster 13 and at their rear ends with support blocks 17 which are rockably supported on the rear bolster 14 by means of yokes 18.

Secured to the sills 15 is a wagon box, indicated generally at 19, which has its forward end to the rear of the front bolster 13 so that the forward ends of the sills 15 protrude beyond the box. The box 19 includes three transverse frame pieces 20 to which are secured a wagon bed 21. Completing the wagon box are lower side panels 22 and upper side panels 23 which are secured to side braces 24 and 25, respectively, a lower front panel 26 and an upper front panel 27 which are secured to lower and upper front braces 28 and 29, respectively, and a rear panel 30 which includes a swingable tail gate 31 which is pivoted at 32.

Extending transversely across the rear of the wagon bed 21 is a drive roller 33 which is rotatably mounted in bushings 34 carried on brackets 35 which are bolted to the wagon bed. A pinion 36 is keyed to one end of the drive roller 33 so that the drive roller may be rotated in any convenient manner. As shown in Figs. 1 and 2, the mechanism for rotating the drive roller is a pivoted lever 37 which has a ratchet arm 38 to engage the teeth of the pinion 36 and a brake arm 39 which is separately mounted on the same pivot as the lever 37 to prevent reverse rotation of the driven roller 33 when the ratchet 38 is moved forward on each stroke of the pivoted lever 37. It is plain that conventional power operated means may be substituted for the hand lever and ratchet.

Wound on the drive roller 33 is a canvas apron 40 which is long enough to be drawn forward to lie in the wagon bed with slack in the wagon bed and with the free end of the apron hanging over the upper front panel 27. The canvas apron 40 is preferably made from No. 8 reverse construction canvas duck which is treated with a mildew and rot proofing compound, and with a paraffin water proofing compound which serves to protect it against wear as it is drawn back and forth over the wagon bed. At the upper front margin of the wagon box is a tie bar 41 on which is mounted an idler roller 41a over which the front of the canvas apron 40 may be hung. Thus the free end of the canves is within the wagon box where it is not exposed to the wind which may displace the forward part of the apron if it is hung over the front panel of the wagon box.

Folding means, indicated generally at 42, includes a pair of arms 43 and 44 which are mounted just inside the side panels 22 of the wagon box and have outturned lower ends 45 and 46, respectively, projecting through apertures in the side panels 22 so that the arms 43 and 44 may be pivoted forwardly and rearwardly with respect to the wagon box. The outer end portions 47 and 48 of the arms 43 and 44 are bent, as best seen in Fig. 3, so that when the arms are in their forward positions a folder bar 49 which extends between said arms is spaced above the wagon bed 21. The outturned portion 46 of the arm 44 terminates in a handle 50 outside the side panel 22 of the wagon box so that the folding means may be swung from front to rear on its pivots 45 and 46 by a person standing alongside the wagon. The end portions 47 and 48 of the arms are preferably set at an angle of about 37½° with respect to the arms themselves, so as to produce a positive engagement with the fabric apron 40 when the folder is swung from front to rear to form a fold in the apron. Other angular dispositions of the ends of the arms appear to be inferior in this regard to the 37½° angle.

Extending rearwardly from the pivot of the folder 42 is a shallow ramp 51 which is inclined upwardly toward the rear of the wagon bed to provide a shallow step 52 affording a recess in which the folder bar 49 rests when the folder is in its rearward position, as seen in Figs. 2 and 3. The recess permits the folder bar 49 to drop below the level of a load of silage in the wagon box, so that it does not obstruct the movement of the apron 40 and of the silage thereon along the wagon bed 21. The stiffness of the apron 40 holds the folder bar 49 up slightly until the fold is pulled out of the apron; but once the fold is pulled out the angular disposition of the outer ends of the arms 43 and 44 permits the folder bar to drop wholly into the recess afforded at the rear of the step 52. Alternatively, instead of the ramp 51 a transverse channel may be formed in the wagon bed to receive the folder bar 49.

The wagon box may appropriately be 6' to 7' wide outside by 12' to 14' long, with a canvas apron 21' to 24' long by 60" to 76" wide wound on a 3" diameter drum. The arms 43 and 44 of the folder means 42 are preferably 2' long, so as to form a 4' fold in the apron. Conveniently ropes may be secured to the corners of the free end of the apron which hang over the idler roller 41a at the front of the wagon even when the apron 40 is fully rolled on the drive roller 33.

When the apron 40 is to be readied for use the ratchet finger 38 and brake 39 are disengaged from the pinion 36 and the free end of the apron is drawn forward in the wagon bed and several feet of the apron are draped over the idler roller 41a at the front of the wagon box. Then a small amount of slack is pushed and worked into the apron in the wagon bed so that it may be better engaged by the folder bar 49 which is in its forward position. Conveniently the operator stands on the protruding forward ends of the sills 15 to work with the canvas. The handle 50 of the folder means 42 is grasped and swung slowly rearwardly, the folder bar 49 engaging the apron 40 and drawing the forward portion thereof rearwardly to form a double fold 53 which overlies the shallow ramp 51. When the movement of the folder means is completed the folder bar 49 drops partly into the recess behind the step 52 and the weight of the folder bar resting on the apron anchors it securely against displacement by jolting of the wagon or by wind. However, the fold may be readily drawn out of the canvas by rolling the canvas onto the drive roller 33; and when the fold is gone the folder bar drops wholly into the recess so as not to obstruct movement of the forward part of the apron and load.

As best seen in Fig. 5 the front bolster 13 of the wagon frame 10 is an inverted U-shaped channel member, and a pair of spaced inverted U-shaped yokes 54 are mounted straddling the front bolster 13 and are secured thereto by means of bolts 55 which pass through vertically elongated slots 56 in the bolster 13 so that the yokes 54 may rock fore and aft with respect to the bolster. Extending upwardly from the yokes 54 are a pair of support arms 57 between which is a spacer member 58 on which is mounted hoist means, indicated generally at 59. As best seen in Fig. 4 the support arms 57 have inturned upper ends which are secured to the top of the hoist means to provide a laterally stable assembly. The hoist means may be a hydraulic ram, or as shown in the drawings a hand operated hydraulic jack having a cylinder 60 provided with a piston 61 and piston rods 62. Affixed to the upper end of the piston rod 62 is a bifurcated bracket 63 in which a sheave 64 is journaled. Trained over the sheave 64 is a cable 65 which has one end secured to an eye 66 on the spacer member 58 and which has its other end secured to an eye 67 adjacent the bottom of the front panel 26 of the wagon box. As seen in Fig. 5, the mounting yokes 54 are wider than the bolster 13 so that they may rock thereon longitudinally with respect to the wagon bed, and the sheave 64 engages an upright track 68 on the front panel of the wagon box so that as the wagon box is elevated the sheave remains in contact with the track and reduces the bending strain which would be exerted on the piston rod 62 if the hoist mounting remained vertical and the angle of the cable 65 from the sheave to the eye 67 increased. In order to provide lateral stability for the wagon box as it is raised and lowered the track 68 is provided with flanges 69 which may engage the sides of the sheaves 64 to prevent excessive sideway of the wagon box as it is raised and lowered.

As best seen in Fig. 4 the front bolster 13 is provided with a pair of positioning blocks 70 which engage the sides of the support blocks 16 on the sills 15 to fix the position of the wagon bed when it is in its normal position. It will be noted that the positioning blocks 70 flare slightly at their upper ends to facilitate entry of the supporting block 16 as the wagon box is lowered.

The hoist mechanism here shown is quite inexpensive and permits the front of the wagon box to be elevated about 20°, or a distance of about three feet. A small amount of hand forking will start the rear top of the load of silage moving into the blower hopper, but the material does not slide of its own weight on a 20° incline. The winding of the canvas apron 40 is then started, and this begins to move the rear half of the load off the wagon bed. Power requirements for drawing the canvas rearwardly are quite low because of the fact that only one half of the load is moved at a time and also because the 20° slant of the wagon bed assists in moving the load rearwardly. The top portion of the front part of the load may begin to slump down as soon as the rear part of the load is moved away, and if it tends to stick together only a small amount of hand forking is necessary to get it started.

It will be seen from the foregoing description that the mechanism which has been provided is simple and rugged so that it is entirely suited to farm use; that it does not interfere in any respect with use of the wagon for purposes other than silage hauling; and that the combination of a low lever hoist with a folded canvas apron provides a more evenly controlled flow of silage to the screw conveyor, with less hand forking, than is possible with any unit heretofore available.

I claim:

1. A farm wagon for hauling silage comprising: a wheeled frame which includes a front bolster; a wagon box supported on said frame with its front end to the rear of said front bolster; upright hoist means mounted on the front bolster for elevating the front of the wagon box; a roller extending across the rear of the wagon box; a fabric apron wound on said roller which is substantially longer than the wagon box so that it may be laid in the wagon bed with its free end hanging over the front of the box; folding means including a folder bar extending across the wagon bed and a handle secured to the folder bar and positioned outside the wagon box, whereby the folder bar may be manipulated to engage the apron and draw its forward portion rearwardly to form a transverse fold in said apron approximately halfway back in the wagon box; and means for rotating said roller to wind the apron on the roller and pull out said fold.

2. A farm wagon for hauling silage comprising: a wheeled frame which includes a front bolster; a wagon box supported on said frame with its front end to the rear of said front bolster; upright hoist means mounted for longitudinal tilting movement on the front bolster for elevating the front of the wagon box; guide means carried by said front frame member engaging means at the front of the wagon box to prevent sideway of the wagon box as it is elevated; a roller extending across the rear of the wagon box; a fabric apron wound on said roller which is substantially longer than the wagon box so that it may be laid in the wagon bed with its free end hanging over the front of the box and slack lying in the wagon bed; folding means including a folder bar extending across the wagon bed and a handle secured to the folder bar and positioned outside the wagon box, whereby the folder bar may be manipulated to engage the apron and draw its forward portion rearwardly to form a transverse fold in said apron approximately halfway back in the wagon box; and means for rotating said roller to wind the apron on the roller and pull out said fold.

3. In a box type farm wagon for hauling silage, apron type unloading means comprising: a roller extending across the rear of the wagon box; a fabric apron wound on said roller which is substantially longer than the wagon box so that it may be laid in the wagon bed with its free end hanging over the front of the box and slack lying in the wagon bed; folding means including a folder bar extending across the wagon bed and a handle secured to the folder bar and positioned outside the wagon box for swinging the folder bar from front to rear from a location outside the wagon box to engage the apron and draw its forward portion rearwardly to form a transverse fold in said apron approximately halfway back in the wagon box; and means for rotating said roller to wind the apron on the roller and pull out said fold.

4. In a box type farm wagon for hauling silage, apron type unloading means comprising: a roller extending across the rear of the wagon box; a fabric apron wound on said roller which is substantially longer than the wagon box so that it may be laid in the wagon box with its free end hanging over the front of the box and slack lying in the wagon bed; folding means including a folder bar extending across the wagon bed and a handle secured to the folder bar and positioned outside the wagon box for swinging the folder bar from front to rear from a location outside the wagon box to engage the slack in the apron and draw the forward portion of the apron rearwardly to form a transverse fold in said apron approximately halfway back in the wagon box; a recess in the bed of the wagon box to receive said folder bar in its rearward position; and means for rotating said roller to wind the apron on the roller and pull out said fold.

5. The device of claim 4 in which the recess to receive the folder bar is provided by a shallow ramp on the wagon bed which is inclined upwardly from front to rear of the wagon bed to provide a step behind which the folder bar may lie in its rearward position.

6. In a box type farm wagon for hauling silage, apron type unloading means comprising: a drive roller extending across the rear of the wagon box; an idler roller extending across the wagon box close to the front upper margin thereof; a fabric apron wound on said drive roller which is substantially longer than the wagon box so that it may be laid in the wagon box with its free end hanging over the idler roller and inside the box and slack lying in the wagon bed; folding means including a folder bar extending across the wagon bed and a handle secured to the folder bar and positioned outside the wagon box for swinging the folder bar from front to rear from a location outside the wagon box to engage the slack in the apron and draw the forward portion of the apron rearwardly to form a transverse fold in said apron approximately halfway back in the wagon box; and means for rotating said drive roller to wind the apron thereon and pull out said fold.

7. In a box type farm wagon for hauling silage, apron type unloading means comprising: a roller extending across the rear of the wagon box; a fabric apron wound on said roller which is substantially longer than the wagon box so that it may be laid in the wagon bed with its free end hanging over the front of the box and slack lying in the wagon bed; folding means including a pair of arms pivotally mounted parallel to and immediately inside the side walls of the wagon box and having their free ends connected by a folder bar, and a handle on each side of the wagon box, each handle being connected to one of said arms for swinging the folding means from front to rear from outside the wagon so that the folder bar may engage the slack in the apron and draw the forward portion of the apron rearwardly to form a transverse fold in said apron approximately halfway back in the wagon box; and means for rotating said roller to wind the apron on the roller and pull out said fold.

8. The device of claim 7 in which the wagon bed is provided with a transverse recess to receive the folder bar in its rearward position.

9. The device of claim 8 in which the free ends of the arms are bent so that the folder bar is spaced above the wagon bed in its forward position and lies in said recess in its rearward position.

10. In a box type farm wagon for hauling silage, apron type unloading means comprising: a drive roller extending across the rear of the wagon box; an idler roller extending across the wagon box adjacent the front upper margin thereof; a fabric apron wound on said drive roller which is substantially longer than the wagon box so that it may be laid in the wagon bed with its free end hanging over the idler roller and slack lying in the wagon bed; a transverse recess in the bed of the wagon to the rear of the center line thereof; folding means including a pair of arms pivotally mounted parallel to and immediately inside the side walls of the wagon box, the free ends of said arms being bent and connected by a folder bar which may lie in a forward position spaced above the wagon bed or in a rearward position in said recess, and a handle outside the wagon box connected to one of said arms for swinging the folding means from front to rear to engage the slack in the apron and draw the forward portion of the apron rearwardly to form a transverse fold in said apron and position said folder bar in said recess; and means for rotating said drive roller to wind the apron on the roller and pull out said fold.

References Cited in the file of this patent

UNITED STATES PATENTS

| | | |
|---|---|---|
| 1,328,137 | Doud | Jan. 13, 1920 |
| 1,925,296 | Barrett | Sept. 5, 1933 |
| 2,233,111 | Roberts | Feb. 25, 1941 |
| 2,448,122 | Recker | Aug. 31, 1948 |
| 2,463,987 | Malone et al. | Mar. 8, 1949 |
| 2,477,707 | Walz | Aug. 2, 1949 |
| 2,573,478 | McKendrey | Oct. 30, 1951 |